Oct. 30, 1951    W. J. HUSHLEY    2,573,200
GLASS FOR EMBEDDING ZINC SULFIDE PHOSPHORS
Filed June 29, 1949
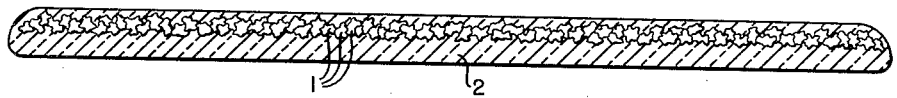
WITNESSES:
INVENTOR
Walter J. Hushley.
BY
ATTORNEY Patented Oct. 30, 1951

2,573,200

UNITED STATES PATENT OFFICE 2,573,200

GLASS FOR EMBEDDING ZINC SULFIDE PHOSPHORS

Walter J. Hushley, Pittsburgh, Pa., assignor to Westinghouse Electric Corporation, East Pittsburgh, Pa., a corporation of Pennsylvania Application June 29, 1949, Serial No. 101,963

7 Claims. (Cl. 106—54)

My invention relates to screens presenting extended areas of phosphors such as zinc sulphide or cadmium sulphide. For practical reasons the phosphor in such screens must be present in a thin layer, and where such phosphor layers are deposited on conventional support plates, their surface is not very smooth, but shows considerable roughness and irregularity. This invention relates to screens of this type which must have extremely smooth surfaces, approaching that of plate glass. It is also of value for phosphor screens which are to be positioned in enclosures which contain alkali vapors or other substances likely to deleteriously affect the radiative properties of the screens. To give one illustration, image intensifier tubes are described in Hunter and Longini application Serial No. 771,112, filed August 28, 1947, now Patent No. 2,555,545, June 5, 1951, for an Image Intensifier, which contains a fluorescent (i. e. phosphor) screen bearing a photoelectric surface containing alkali metal at one end and a second phosphor screen at its other end. My invention is applicable to each of these screens.

One object of my invention is to form a self-supporting non-porous thin glass plate, at least one surface of which is glossy smooth, and which contains particles of a phosphor such as zinc sulphide embedded in a matrix of glass.

Another object is to protect phosphors from deleterious effects of environing atmospheres by coating their particles with glass.

Another object is to form a phosphor screen in which the phosphor is protected by being embedded in a glass coating.

Still another object is to provide a method of embedding particles of an X-ray phosphor such as zinc sulphide in a matrix of transparent glass in which they are completely enclosed beneath the glass surface.

Still another object of my invention is to provide a novel kind of protective matrix for particles of phosphor.

A still further object of my invention is to provide a novel glass.

Other objects of my invention will become evident upon reading the following description taken in connection with the drawing which shows in cross-section a phosphor screen made in accordance with the principles of my invention.

Referring to the drawing, the completed phosphor screen embodying the principles of my invention comprises particles 1 of a phosphor such as zinc sulphide, cadmium sulphide, or zinc-cadmium sulphide embedded in a matrix 2 of glass, the latter preferably completely covering the tops of the phosphor particles and having a smooth glossy surface. The under surface of the glass is preferably smooth also, and the entire composite sheet non-porous. If the phosphor to be used is a zinc sulphide X-ray phosphor, the phosphor particles are preferably 20 microns in diameter, although other sizes are within the scope of my invention. If the screen is to be used in an image intensifier tube like that mentioned above, the glass matrix is preferably 0.05 cm. thick, though sheets from 0.02 cm. to 0.3 cm. may still be formed by employing my invention. Screens 20 cm. in diameter may be formed by means of my invention although screens of other diameters are also readily formed by my procedure. For image tube purposes there should be no excess glass, at least the excess glass thickness should be small compared to the total thickness. The glass should be from .001 cm. to 0.05 cm. above and below the tip of the phosphor particles. However screens can be made with an excess glass layer above or below, or above and below the phosphor layer.

The preferred method for forming the screen consists of grinding a suitable glass into a powder and depositing a very thin layer of this powder on a sheet of metal such as .00075 inch nickel or .005 inch aluminum. It is usually desirable to fuse this first layer since this improves the wetting of the metal by additional layers and prevents the formation of globules of glass when thicker layers are fused. A second layer of a mixture of glass powder and of phosphor particles such as zinc sulphide X-ray phosphor is then deposited. The glass powder in this mixture should be rather coarse, e. g. having particles about .01 cm. in diameter. For image tube purposes the mixture contains glass and phosphor in such a ratio that the finished plate will contain the minimum amount of glass but yet approach the smoothness of a glass plate on top. If desired, a third thin layer of glass powder may be put on. This preparation is then inserted into an oven containing an atmosphere and at a temperature not harmful to the phosphor but at which the glass will flow. The glass flows around the phosphor particles and forms a solid sheet enclosing the phosphor in glass with a smooth surface on top. The plate is then removed from the oven or cooled in the oven. If the glass had been deposited on nickel foil, the nickel is stripped off leaving a self-supporting plate of phosphor in glass. If the glass had been deposited on aluminum foil, the latter is left on the glass since it adheres too strongly to be removed easily and also it serves a useful purpose when the screen is used in an image tube. If the glass requires a temperature greater than 650° C. to flow to smoothness when mixed with a phosphor, it is put on a nickel foil. A glass which flows at 650° C. is usually put on an aluminum foil.

A variation of the method consists of depositing first a layer of glass, second a layer of phosphor, and inserting them in an oven at a temperature at which the glass will flow and envelop the phosphor. This method is somewhat less desirable since a higher temperature must be used.

The glass used must have a low viscosity at temperatures to which the phosphor such as zinc sulphide may be heated. The glass must also not adhere too strongly to the metal which forms a temporary support. For phosphors such as zinc sulphide the atmosphere of the oven should be non-oxidizing such as nitrogen or a mixture of nitrogen and hydrogen. It is found desirable not to have too many finely divided particles in the glass powder and these are removed by elutriation or sieving if too large a part of the glass is finely ground. A sieve of 200 mesh has been found suitable for this purpose. Furthermore, the glass must have approximately the same coefficient of thermal expansion as the phosphor, otherwise the resulting plate would crack or would lack structural strength. The resulting plate may have some porosity inside but this is undesirable. The resulting surface may be somewhat undulating or rough if the temperature at which the glass is fused is not high enough. A temperature of 650° C. has worked well with the glass I describe below.

The glass and/or phosphor powder may be deposited by air settling or by the use of a liquid medium which is then decanted or evaporated off.

One may also deposit the glass and phosphor powder onto a metal, a ceramic or other support to which the glass will adhere without cracking and leaving this support on the glass plate if the support is not objectionable in the use of the phosphor. This support may be a plate or a sheet or it may be a layer of powder or of flakes such as inconel powder, fused alumina powder or other inorganic powders. A part of the powder layer will adhere to the glass plate.

One may also deposit the glass and phosphor on a thick metal or other support to which the glass will not adhere and remove the glass plate after it has been fused.

The temporary or other support on which the glass plate is fused need not be flat but may have any suitable curvature.

The glass which is initially deposited on the metal or other support need not be of the same composition or pulverized to the same degree as the glass which is used with the phosphor. It is convenient to use a glass which contains no alkali metals, e. g. 85% boric oxide, 15% silica, since the nickel foil is then more easily peeled off and there is less corrosion of aluminum foil.

The fusion of the glass into a plate may be done by one or more heating operations. All the desired layers may be deposited and the whole fused with one heating, or the preparation may be heated to fuse the glass after each layer separately. Also the oven temperature may be varied during the heating to obtain the most desirable result.

The glass used in the foregoing procedure will now be described.

Sulphide phosphors such as ZnS or CdS are very susceptible to poisoning by even small traces of copper and some other metals particularly at high temperatures. The poisoning changes the emission spectrum and the afterglow characteristics of the phosphor as well as reducing its efficiency. Certain common glass components such as alkali oxides or alkali fluorides promote poisoning of the phosphor probably by acting as a flux for the poisoning elements. The glass used must therefore be made of chemical components which do not contain the undesirable elements which poison the phosphor and which contain the minimum of those agents which promote poisoning. The glass must be transparent to the light emitted by the phosphor. Its viscosity must be low at temperatures of about 700° C. so that it will envelop the phosphor particles but the melting point should not be too low so that it may be outgassed in vacuum at temperatures normally used for such purposes.

Since the X-ray phosphor particles are rather large being about 20 microns in diameter, the coefficient of thermal expansion of the glass must be approximately the same as that of zinc sulphide, otherwise the glass-phosphor mixture would crack upon cooling after being fused.

The glass should have good chemical durability. It should not be excessively hydroscopic and it should not froth or form a porous layer upon heating to about 700° C.

A glass which meets the above requirements can have a composition by weight within the following limits by weight:

|   | Per cent |
|---|---|
| 1. Boron oxide | 60 to 85 |
| 2. Silica | 10 to 20 |
| 3. Zinc oxide | 3 to 10 |

4. A mixture or any one of alkali metal oxides or alkali metal halides in sufficient amount to make the glass transparent and reduce its viscosity so that it flows readily around the phosphor particles at the temperature to which the melt is heated in forming the matrix; e. g. at 700° C. mentioned above. I have found that the alkali-metal oxides or halides will usually aggregate 3% to 8% when this is done.

I have found that the stability of glass may be increased by adding a few percent, e. g., up to 5% of non-water-soluble materials such as BeO, $Al_2O_3$, MgO and CaO without substantially depreciating the desired properties of the phosphor screen made as described above.

The essential features of this glass are that it consists chiefly of boron oxide and is very low in alkali metals. Silica, zinc oxide and small quantities of other refractory oxides are added to reduce the coefficient of thermal expansion of boron oxide and to increase its chemical durability. Some alkali oxides or alkali fluorides are added sufficient to make the glass transparent and reduce its viscosity.

The above compounds which it is assumed compose the glass are obtained from materials of high chemical purity and may consist of carbonates, borates, silicates or any other compounds which upon heating will decompose to or yield the compounds listed in the composition.

As a very specific example of the glass, I have found the following to be satisfactory for screens to be used as in the above-mentioned Image Intensifier application: 74% $B_2O_3$, 15% $SiO_2$, 5% ZnO, 1% $Al_2O_3$, 4% $Na_2O$, 1% NaF by weight.

This glass when used as described above flows to smoothness at 650° C. and may therefore be put on an aluminum foil.

I claim as my invention:

1. A glass composed essentially of 74% $B_2O_3$; 15% $SiO_2$; 5% ZnO; 1% $Al_2O_3$; 4% $Na_2O$; and 1% NaF by weight.

2. A glass composed essentially of from 60 to 85% by weight of $B_2O_3$, from 10 to 20% by weight of $SiO_2$, from 3 to 10% of ZnO, and at least one alkali metal compound selected from the group consisting of the alkali metal oxides and halides and in sufficient quantity to make said glass transparent.

3. A glass composed essentially of from 60 to 85% by weight of $B_2O_3$, from 10 to 20% by weight of $SiO_2$, from 3 to 10% of ZnO, and at least one alkali metal compound selected from the group consisting of the alkali metal oxides and halides and in sufficient quantity to make said glass transparent and to reduce its viscosity so that it will flow readily about particles of a 20 micron diameter which are insoluble in it at a temperature of 700° C.

4. The composition of claim 2 with the addition thereto of up to 5% of its weight of at least one refractory oxide selected from the group consisting of alumina, magnesia, beryllia and calcium oxide.

5. The composition of claim 3 with the addition thereto of up to 5% of its weight of at least one refractory oxide selected from the group consisting of alumina, magnesia, beryllia and calcium oxide.

6. A glass composed essentially of from 60 to 85% by weight of $B_2O_3$, from 10 to 20% by weight of $SiO_2$, from 3 to 10% by weight of ZnO, and from 3 to 8% by weight of at least one alkali-metal compound selected from the group consisting of the alkali metal oxides and halides.

7. The composition of claim 1 with the addition thereto of up to 5% of its weight of at least one refractory oxide selected from the group consisting of alumina, magnesia, beryllia and calcium oxide.

WALTER J. HUSHLEY.

REFERENCES CITED

The following references are of record in the file of this patent:

UNITED STATES PATENTS

| Number | Name | Date |
|---|---|---|
| 2,393,449 | Armistead | Jan. 22, 1946 |

FOREIGN PATENTS

| Number | Country | Date |
|---|---|---|
| 582,407 | France | 1924 |
| 68,817 | Sweden | 1930 |